United States Patent [19]
Kato et al.

[11] Patent Number: 5,971,801
[45] Date of Patent: Oct. 26, 1999

[54] SERVICE PLUG HAVING A LEVER MECHANISM FOR POSITIONING CIRCUIT TERMINALS AND SHORT-CIRCUITING TERMINALS

[75] Inventors: Hisaharu Kato; Hidehiko Kuboshima; Masahiro Deno, all of Shizuoka, Japan

[73] Assignee: Yazaki Corporation, Tokyo, Japan

[21] Appl. No.: 08/924,647

[22] Filed: Sep. 5, 1997

[30] Foreign Application Priority Data

Sep. 11, 1996 [JP] Japan ..................................... 8-240681

[51] Int. Cl.[6] ................................................. H01R 31/08
[52] U.S. Cl. .......................... 439/511; 439/157; 439/484
[58] Field of Search ................................... 439/509, 511, 439/157, 484, 621

[56] References Cited

U.S. PATENT DOCUMENTS

| | | | |
|---|---|---|---|
| 3,836,938 | 9/1974 | Barrett | 439/157 |
| 4,090,667 | 5/1978 | Crimmins | 439/511 |

*Primary Examiner*—Neil Abrams
*Assistant Examiner*—Javaid Nasri
*Attorney, Agent, or Firm*—Sughrue, Mion, Zinn, Macpeak & Seas, PLLC

[57] ABSTRACT

A service plug is provided with circuit terminals respectively connected to the end of an open electric circuit, a circuit housing provided with the circuit terminals inside and terminal insertion holes, a pair of guide grooves stood on the surface on which the terminal insertions holes are made, guide grooves formed on the respective opposite surfaces of the guide walls, the plug body provided with short-circuiting terminals for short-circuiting the circuit terminals, a lever rotatably coupled to the plug body via a turning shaft which is long in the opposite direction of the guide walls, and bosses which are protruded from both sides of the lever, enter the guide grooves and position the circuit terminals and the short-circuiting terminals.

3 Claims, 8 Drawing Sheets

SERVICE PLUG HAVING A LEVER MECHANISM FOR POSITIONING CIRCUIT TERMINALS AND SHORT-CIRCUITING TERMINALS

BACKGROUND OF THE INVENTION

The present invention relates to a circuit switching device (a service plug) for opening an electric circuit and cutting off the current of the circuit, and particularly relates to a circuit switching device suitable for an electric automobile and others provided with a high-voltage circuit for driving a motor.

In the switchboard of a high-voltage circuit and others, there is a circuit switching device designed so that an operator is prevented from getting electric shock by detaching a plug provided to the switchboard from a terminal fixed in the body of the switchboard and cutting off the current of the circuit when the operator opens the cover of the switchboard.

Recently, attention is paid to an electric automobile as a pollution-free vehicle which does not exhaust exhaust gas. Also in the electric automobile, since a high-voltage circuit for driving a motor is provided, the current of the circuit is required to be cut off for the same reason as the above in maintenance service. From such a request, in a conventional electric automobile, there has been proposed a circuit switching device (connector device) in which a high-voltage circuit is stored inside a switchboard and the high-voltage circuit is automatically opened when the cover of the switchboard is opened.

FIG. 10 is a perspective view showing a conventional connector device and FIG. 11 is a sectional view showing a process in which the cover of the conventional connector device is shut. A female connector 3 is fixed inside a box-shaped housing 1 the top face of which is open, and the female connector 3 can be connected to external high-voltage cables 5a and 5b via each connector terminal 6. A cover 7 for opening or closing the opening is provided to the housing 1 and is turned around a turning shaft 9 as the center. A guide 11 is provided to the cover 7, and holds a male connector 13 and a guide member 15 which can be moved in the direction perpendicular to the turning shaft 9. A spring 17 shown in FIG. 11 is arranged between the internal wall of the guide 11 and the male connector 13 and presses the male connector 13 and the guide member 15 in the direction in which they approach the turning shaft 9.

In a connector device -19 constituted as described above, when the cover 7 is shut, the male connector 13 approaches the female connector 3, drawing an arc-shaped locus with the turning shaft 9 as the center. Therefore, the male connector 13 is moved in the direction in which it goes away from the turning shaft 9 against pressure by the spring 17 when the guide member 15 comes in contact with an internal wall 20a of a guide hole 20 in a process in which the male connector 13 is fitted into the female connector 3, is again moved by pressure by the spring 17 in the direction in which the male connector approaches the turning shaft 9, is fitted in the female connector 3, absorbing dislocation caused by the arc-shaped locus in the fitting process, and electrifies the high-voltage cables 5a and 5b.

In the meantime, when the cover 7 is opened, the male connector 13 is detached from the female connector 3, being moved again in the direction in which the male connector approaches and goes away from the turning shaft 9, opens a high-voltage circuit between the high-voltage cables 5a and 5b and as a result, can automatically cut off the current of the circuit.

However, in the above conventional connector, since the male connector 13 is provided on the cover 7, it is moved, drawing an arc-shaped locus, therefore, the male connector is required to be pressed by the spring 17 so that the male connector can be moved so as to absorb dislocation caused in a process in which the male connector is fitted into the female connector 3, and there is a problem that the structure is complicated and the number of the parts is increased.

There is also a problem that distortion is caused between the male connector and the female connector in fitting because the male connector 13 is moved, drawing an arc-shaped locus.

Further, in the conventional connector, since a handle such as a lever is not provided-to the cover 7, an operation for opening or shutting is difficult. In the meantime, there is a problem that if a handle is protruded from the cover 7, it becomes an obstacle in an electric automobile and the like the space of which is limited, while a fold type handle cannot hold force required to shut the cover 7 and satisfactory operability can be hardly obtained.

SUMMARY OF THE INVENTION

The present invention has been made in view of the above circumstances and an object is to provide a circuit switching device (service plug) which can be constituted by a small number of parts, is free of distortion between terminals and in addition, can realize satisfactory operability by a handle.

A service plug according to the present invention for achieving the above object is characterized by comprising at least a pair of circuit terminals respectively connected to the end of an open electric circuit, a circuit housing provided with the circuit terminals inside and with terminal insertion holes for the circuit terminals, a pair of parallel guide walls stood on the surface of the circuit housing in which the insertion holes for the circuit terminals are made, guide grooves which are formed on the respective opposite surfaces of the guide walls, are open on the respective end faces of the guide walls and are long in the fitting direction of the circuit terminals, the plug body provided with short-circuiting terminals for short-circuiting the pair of circuit terminals, a lever coupled to the plug body via a turning shaft in the opposite direction of the pair of guide walls so that the lever can be turned, and bosses respectively protruded from both sides of the lever for respectively entering the guide grooves and positioning the circuit terminals and the short-circuiting terminals.

Also, the service plug may be characterized in that the respective lower ends of the guide grooves are set to a position in which the bosses respectively reach when the short-circuiting terminals and the circuit terminals are completely fitted, and refuge grooves formed in the shape of a locus along which the bosses are respectively moved with the turning shaft as the center are joined to the respective lower ends of the guide grooves.

In the service plug constituted as described above, the plug body can be attached or detached in the same direction as the terminal fitting direction, the terminal is not moved along an arc-shaped locus as in the conventional structure, and a mechanism for absorbing dislocation in a fitting process is not required. Since the terminal is not moved along an arc-shaped locus, no distortion is caused in fitting the terminals. Since the short-circuiting terminal is led to the circuit terminal when the bosses are respectively inserted into the guide grooves, the terminal insertion hole is not required to be searched. When the lever is pushed, the short-circuiting terminal and the circuit terminal which start to be fitted are placed in an engaged state, and the bosses respectively enter the guide grooves to be placed in an engaged state, and as a result, the relative rotation between the lever and the plug body is regulated and the lever is stood.

In the service plug in which the refuge grooves are joined to the respective lower ends of the guide grooves, when the bosses are respectively inserted into the guide grooves, the short-circuiting terminal is inserted into the circuit terminal, and the lever is pushed in the direction of the circuit housing, the short-circuiting terminal is fitted in the circuit terminal. At this time, when the short-circuiting terminal and the circuit terminal are fitted by a half, the bosses do not respectively reach the respective lower ends of the guide grooves, the lever is regulated by the guide grooves and cannot be turned around the turning shaft as the center and hereby, it is detected that the short-circuiting terminal and the circuit terminal are fitted by a half.

DETAILED DESCRIPTION OF THE INVENTION

Figure 1:
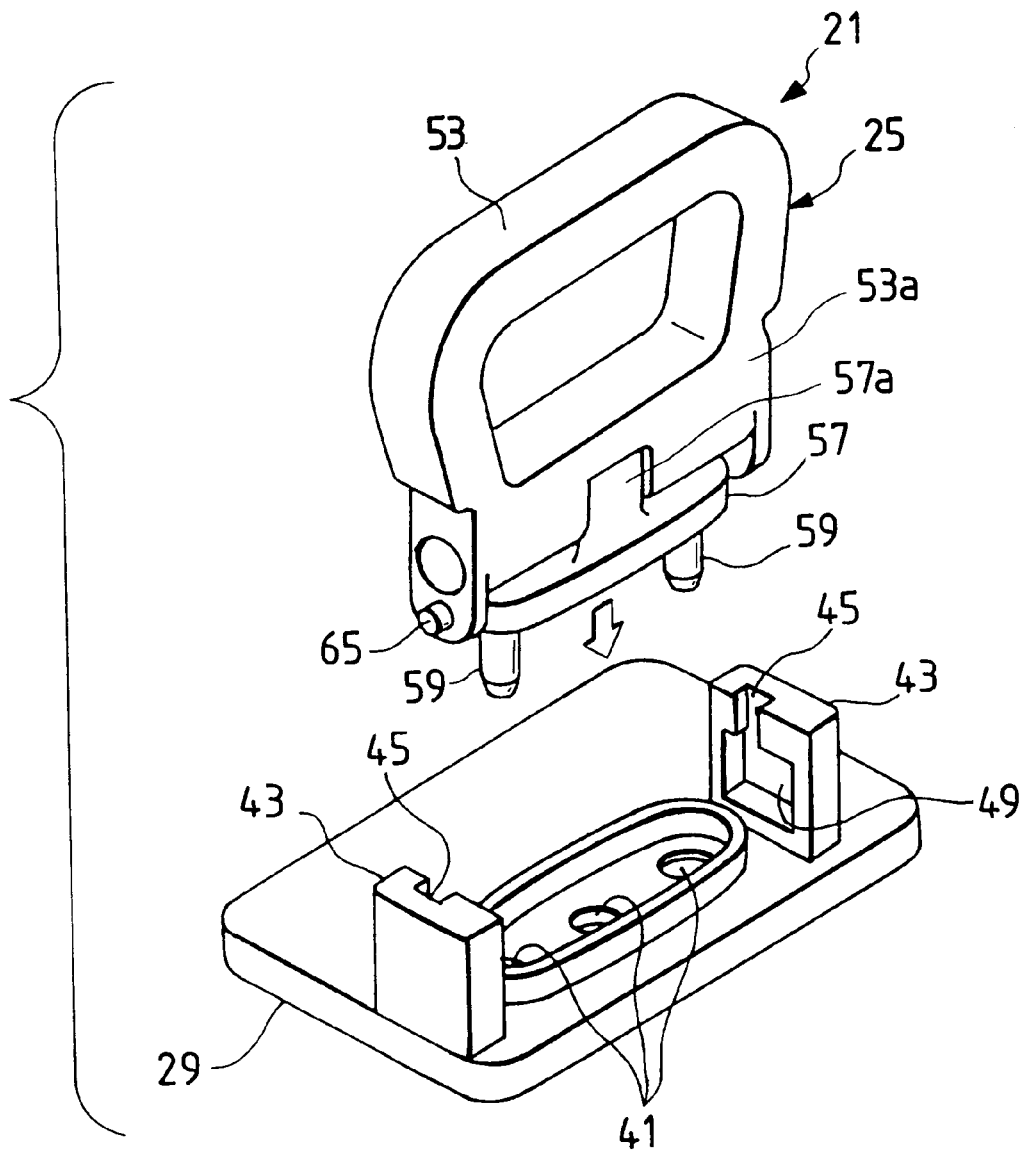
FIG. 1 is a perspective view showing a first embodiment of a service plug according to the present invention.

Referring to the drawings, preferred embodiments of a service plug according to the present invention will be described in detail below.

Figure 2:
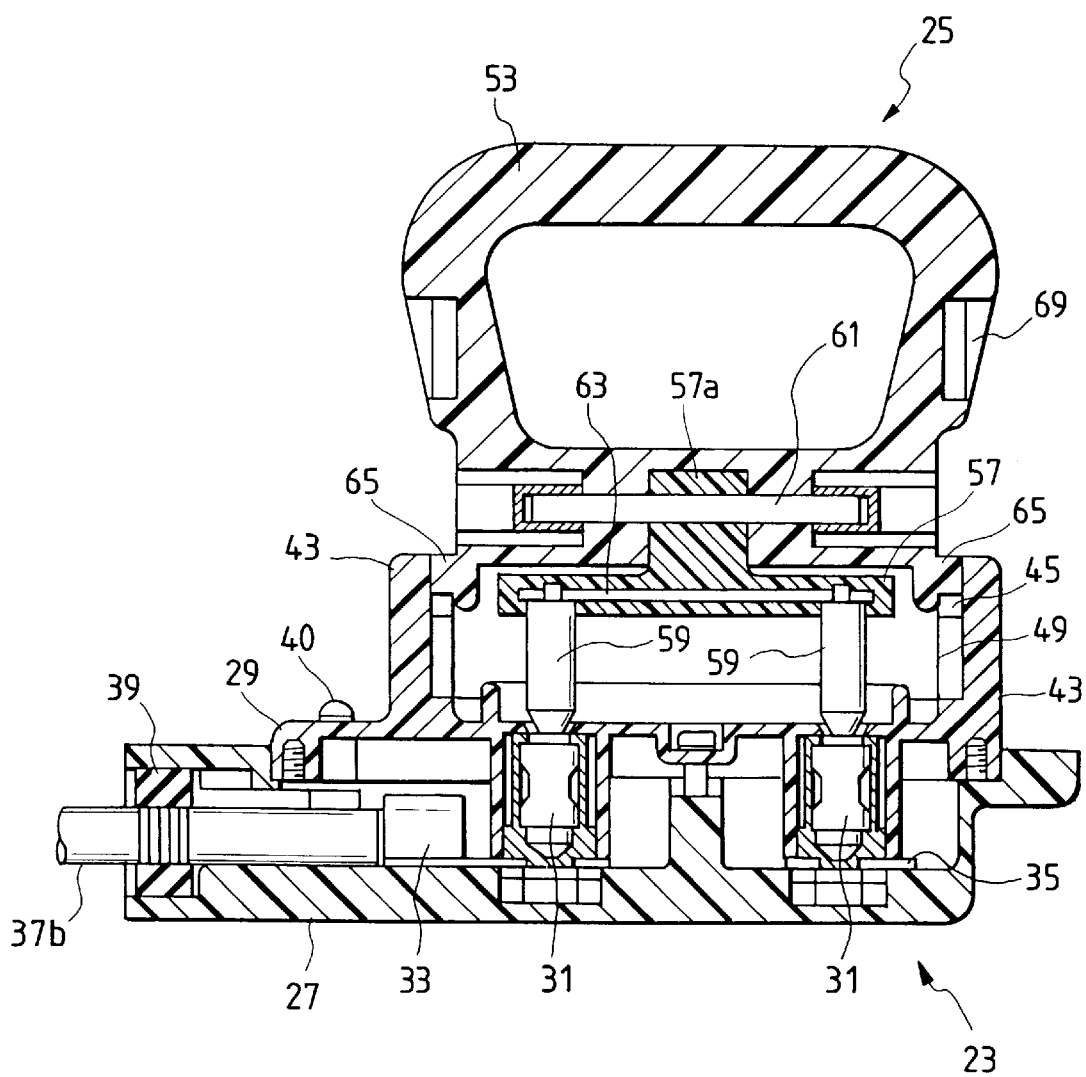
FIG. 2 is a sectional view showing the state at the time when the fitting of a detachable plug of the service plug shown in FIG. 1 is started.
Figure 3:
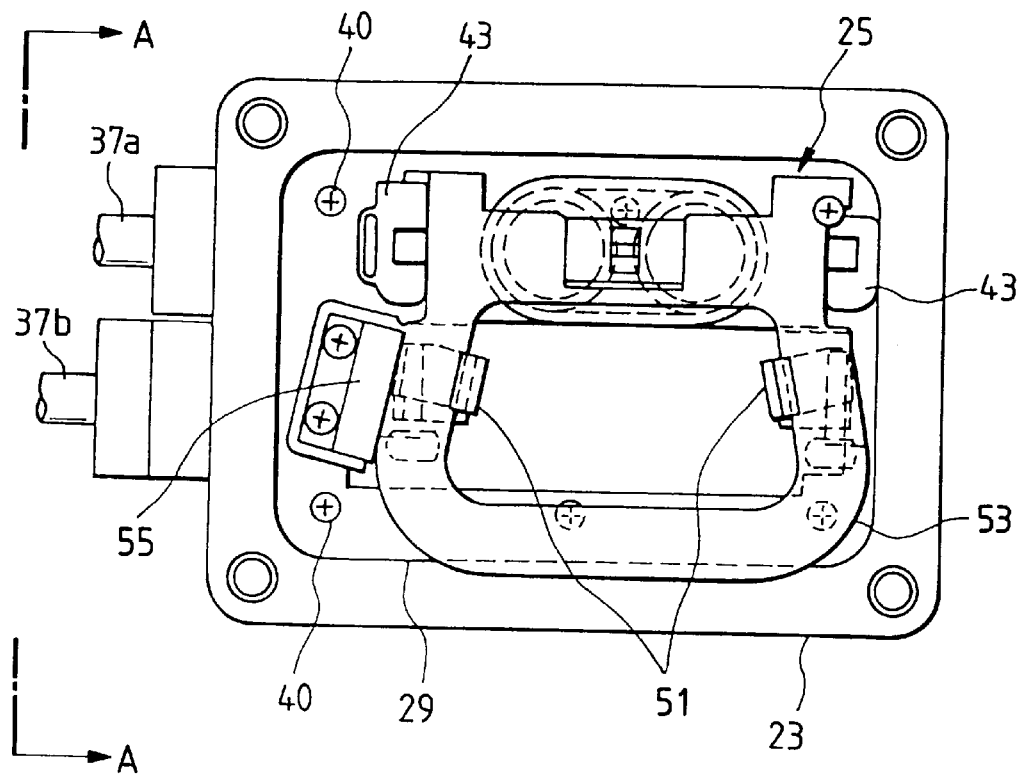
FIG. 3 is a plan showing the state in which a lever of the service plug shown in FIG. 1 is pushed down.
Figure 4:
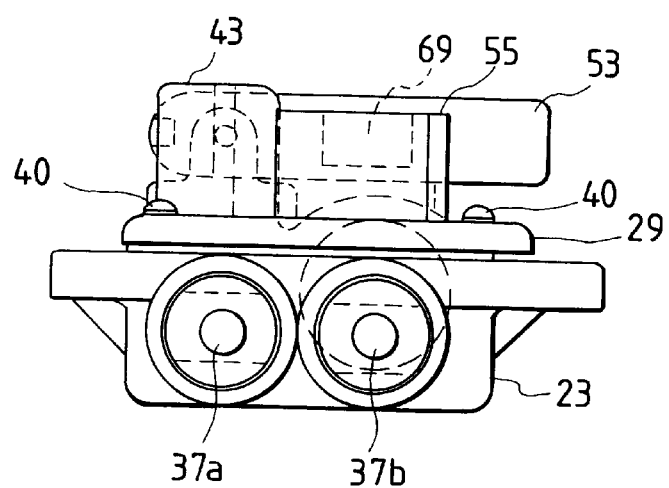
FIG. 4 is a view taken along line A—A in FIG. 3.
Figure 5A:
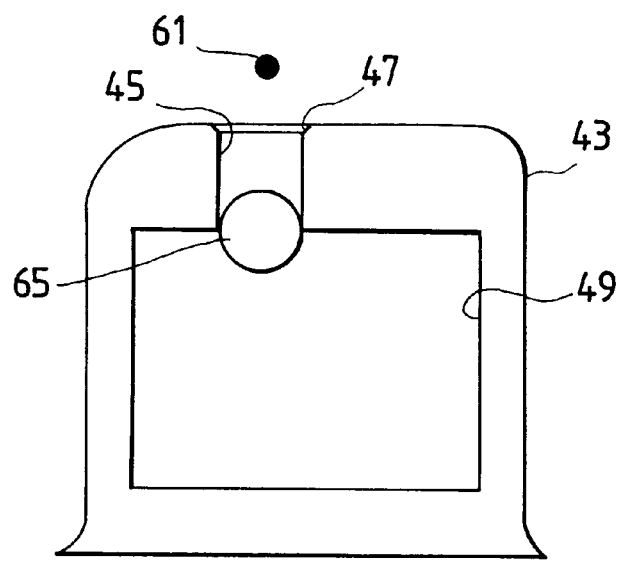
FIGS. 5(a) and 5(B) are enlarged side views showing a guide wall shown in FIG. 1.
Figure 5B:
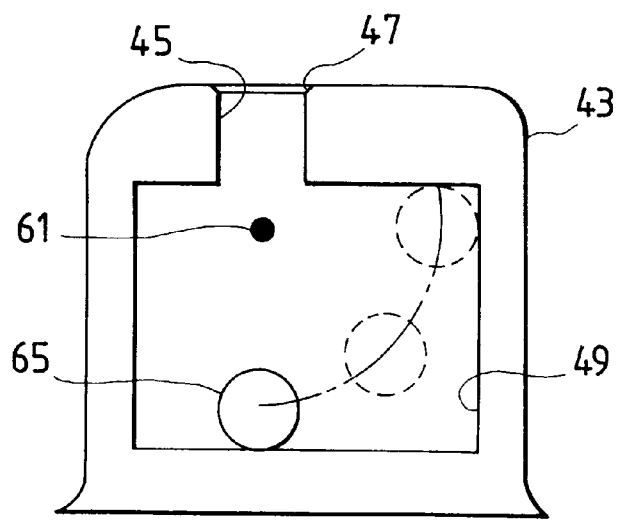
Figure 6:
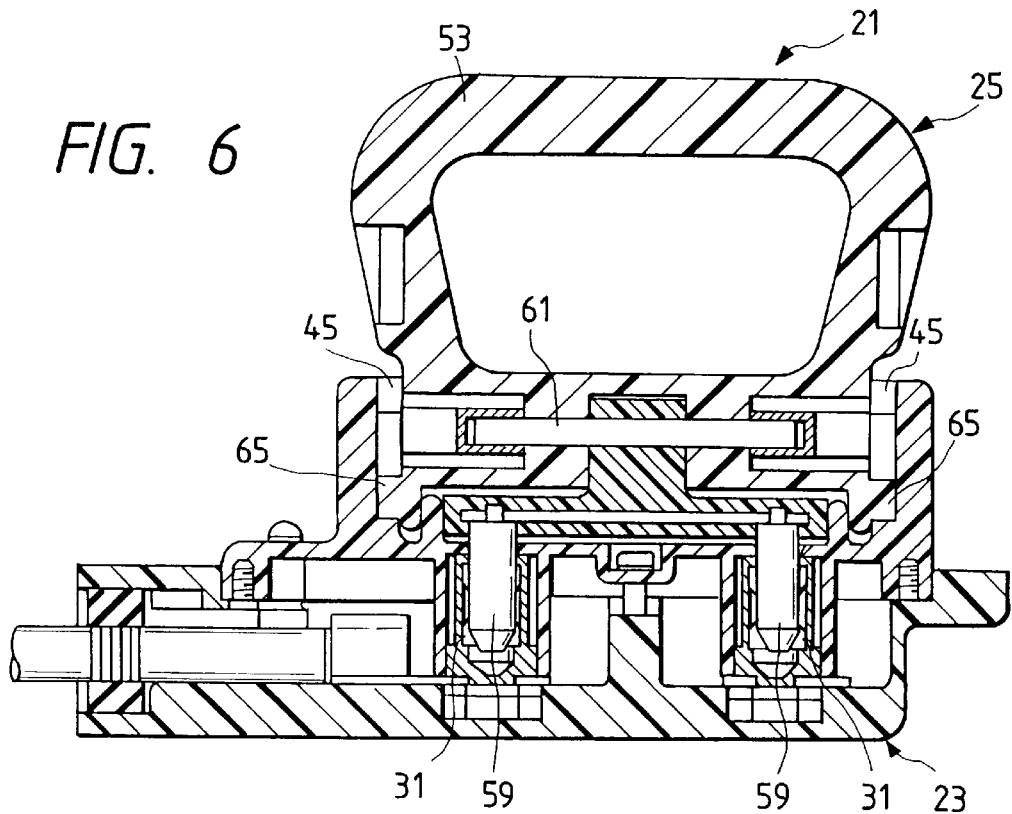
FIG. 6 is a sectional view showing the state at the time when the fitting of the detachable plug of the service plug shown in FIG. 1 is completed.

FIG. 1 is a perspective view showing a first embodiment of a service plug according to the present invention, FIG. 2 is a sectional view showing the state at the time when a detachable plug of the service plug shown in FIG. 1 starts to be fitted, FIG. 3 is a plan showing the state in which a lever of the service plug shown in FIG. 1 is pushed down, FIG. 4 is a view taken along line A—A in FIG. 3, FIGS. 5(A) and 5(B) are enlarged side views showing a guide wall shown in FIG. 1, and FIG. 6 is a sectional view showing the state at the time when the fitting of the detachable plug of the service plug shown in FIG. 1 is completed. The service plug 21 which is a circuit switching device is comprised of a circuit housing 23 and a detachable plug 25 which can be attached to and detached from the circuit housing 23.

The circuit housing 23 is comprised of a box part 27 the upper part of which is open and a cover 29 for closing the opening of the box part 27. Plural female terminals 31 (in this embodiment, two) each of which is a cylindrical circuit terminal are stood in a row in the box part 27, and the fitting direction of each female terminal 31 is vertical as shown in FIG. 2. High-voltage cables 37a and 37b are respectively electrically connected to the female terminals 31 via a terminal 33 or a bus bar 35, and are led outside while a rubber stopper 39 provides waterproof sealing between the high-voltage cables and the box part 27.

The cover 29 is attached to the upper opening of the box part 27 by a screw 40. Terminal insertion holes 41 are made on the cover 29 at the positions corresponding to the female terminals 31, and the center of each terminal insertion hole 41 coincides with the fitting center of each female terminal 31. A pair of parallel guide walls 43 are stood on both sides in the direction in which the terminal insertion holes 41 are arranged in line on the upper surface of the cover 29. A guide groove 45 which has an upper end opened on the upper end face of each guide wall 43 and is long vertically, is formed on the respective opposite surfaces of the guide walls 43. A guidance face 47 shown in FIG. 5, the groove width of which is gradually wider toward an opening at the upper end, is formed in the upper part of the guide groove 45. A concave portion 49, the width of the opposite face of which is substantially equal to that of each guide wall 43 and which is hollowed in the direction of the thickness, is formed in the lower part of the guide groove 45, and the concave portion 49 is continuous to each guide groove 45.

As shown in FIG. 3, a lever lock 51 is provided on the cover 29 to hold a lever 53, described later, of the detachable plug 25 so that the lever 53 is held in the folded state to the cover 29. A limit switch 55 is provided to the cover 29 to open or close a switch contact by magnetic force.

In the meantime, the detachable plug 25 is comprised of the lever 53 formed in the shape of a rectangular frame for example, a plug body 57 rotatably coupled to the lever 53, and male terminals 59 which are short-circuiting terminals protruded from the plug body 57. One side of the rectangular frame of the lever 53 is coupled to the plug body 57 via a turning shaft 61 in the same direction as the above one side. The above plural male terminals 59 (two in this embodiment) are protruded from the surface of the plug body 57 reverse to a turning shaft coupling part 57a, and an interval between the male terminals 59 in a row is set so that it is the same as the interval between the terminal insertion holes 41. A bus bar 63 is provided inside the plug body 57 and conducts electricity to the two male terminals 59. That is, the detachable plug 25 can be fitted in the female terminals 31 and can short-circuit them by holding the lever 53 and inserting the male terminals 59 into the terminal insertion holes 41.

Bosses 65 are protruded from a pair of sides of the lever 53 holding the turning shaft coupling part 53a in the same direction as the turning shaft 61. The bosses 65 are arranged at the side on which the male terminals 59 are protruded with respect to the turning shaft 61. Each diameter and each protruded length of the bosses 65 are set so that they are fitted into the respective guide grooves 45 of the above guide walls 43. The dimensions of the bosses 65 and the male terminals 57 are set in the relative positional relationship in which each end of the male terminals 59 is inserted into each terminal insertion hole 41 immediately after the bosses 65 are respectively inserted into the guidance face 47 of the guide grooves 45.

A magnet 69 is provided inside the lever 53 and arranged so that the magnet is opposite to the limit switch 55 with the lever 53 folded and held by the lever lock 51.

The operation of the service plug 21 constituted as described above will be described below.

In the service plug 21, the male terminals 59 respectively short-circuit the female terminals 31 with the detachable plug 25 inserted into the circuit housing 23 shown in FIG. 6 and a high-voltage current circuit is closed. In a state in which the detachable plug is inserted, the lever 53 is folded with the turning shaft 61 as the center as shown in FIG. 3, and the lever 53 is held on the upper surface of the cover 29 by the lever lock 51. In this state, the limit switch 55 provided on the cover 29 is opposite to the magnet 69 of the lever 53, a contact is operated by the magnetic force of the magnet 69, and the limit switch detects that the lever 53 is in a held state.

To detach the detachable plug 25, the lever lock 51 is released and the lever 53 is stood. Hereby, the magnet 69 of the lever 53 is separated from the limit switch 55, and the limit switch 55 detects that the held state of the lever 53 is released.

Next, the male terminals -59 are respectively pulled out from the female terminals 31 by gripping the lever 53 and pulling out it from the circuit housing 23 in the direction in which the lever is separated, a high-voltage circuit is opened between the male terminals and the female terminals 31, and high-voltage current is cut off. At this time, the bosses 65 are slid through the guide grooves 45 and the detachable plug 25 is detached from the circuit housing 23.

In the meantime, to insert the detachable plug 25 into the circuit housing 23, the lever 53 is gripped and the bosses 65 on both sides of the lever are respectively inserted into the guide grooves 45 of the guide walls 43. The bosses 65 respectively readily enter the guide grooves 45 because they are inserted into the guidance face 47 which is wider than each guide groove 45. In the detachable plug 25, immediately after the bosses 65 respectively enter the guide grooves 45, each end of the male terminals 59 enters the corresponding terminal insertion hole 41.

In this state, the bosses 65 are respectively fitted in the guide grooves 45 and each end of the male terminals 59 enters the corresponding terminal insertion hole 41, so that relative turning between the lever 53 and the plug body 57 with the turning shaft 61 as the center is regulated and the detachable plug 25 is held in a state in which it stands as shown in FIG. 5(A).

Next, when the lever 53 is pushed down in the direction of the circuit housing, the male terminals 59 are respectively fitted in the female terminals 31, and at the same time, the bosses 65 respectively pass through the guide grooves 45 and respectively reach the concave portions 49 as shown in FIG. 5(B).

When the bosses 65 are respectively off the guide grooves 45 and reach the concave portions 49, the regulation of relative turning is released and the lever 53 can be turned with the turning shaft 61 as the-center. Afterward, the lever 53 is folded by turning it, the limit switch 55 is operated by the magnet 69 by holding the folded lever 53 by the lever lock 51, and the limit switch 55 again detects that the lever lock 51 holds the lever.

According to the above service plug 21 as described above, since the detachable plug 25 can be attached or detached to/from the circuit housing 23 in the same direction as the terminals fitting direction, the terminals are not moved along an arc-shaped locus as in the conventional structure, a mechanism for absorbing dislocation in a fitting process is not required to be provided, the structure can be simplified, and the number of parts such as a spring can be also reduced.

Since the terminals are not moved along an arc-shaped locus, distortion between the terminals in fitting can be eliminated and the terminals can be prevented from being deformed.

Since the male terminals 59 can be led to the corresponding terminal insertion hole 41 by inserting the bosses 65 into each guidance face 47, the terminal insertion hole 41 is not required to be searched and the feeling of fit of the detachable plug 25 can be enhanced.

Further, when the lever 53 is pushed down, the male terminals 59 enter the corresponding terminal insertion hole 41, the bosses 65 respectively enter the guide grooves 45, and relative turning between the lever 53 and the plug body 57 is regulated, so that the lever 53 can be held stood, pressure can be readily applied to the lever 53, and the feeling of fit of the detachable plug 25 can be enhanced.

Figure 7:
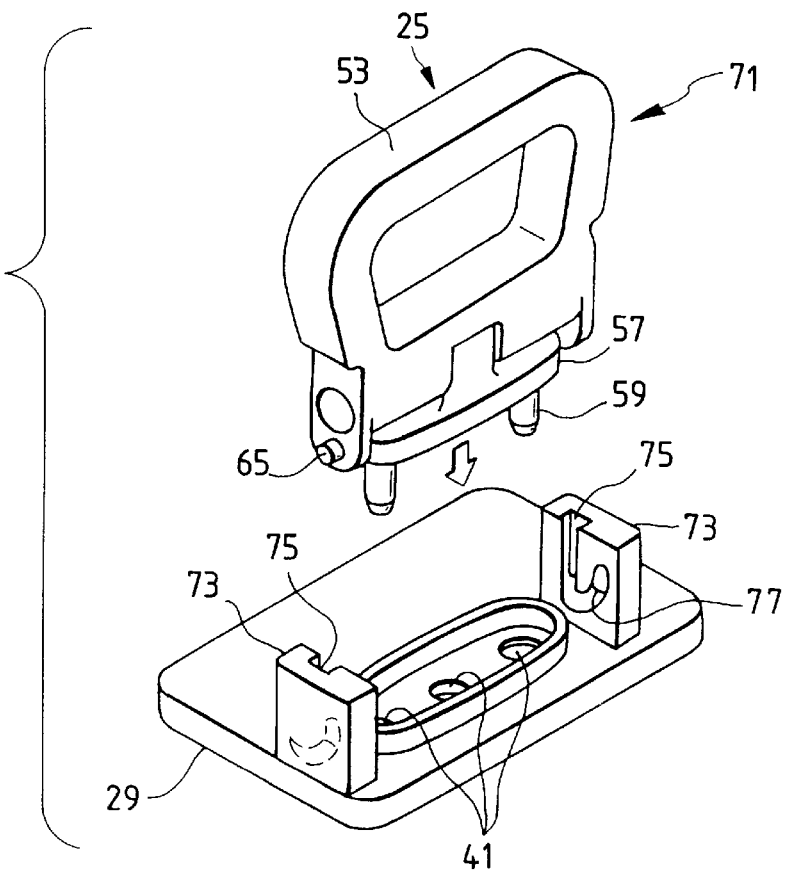
FIG. 7 is a perspective view showing a second embodiment of a service plug according to the present invention.
Figure 8:
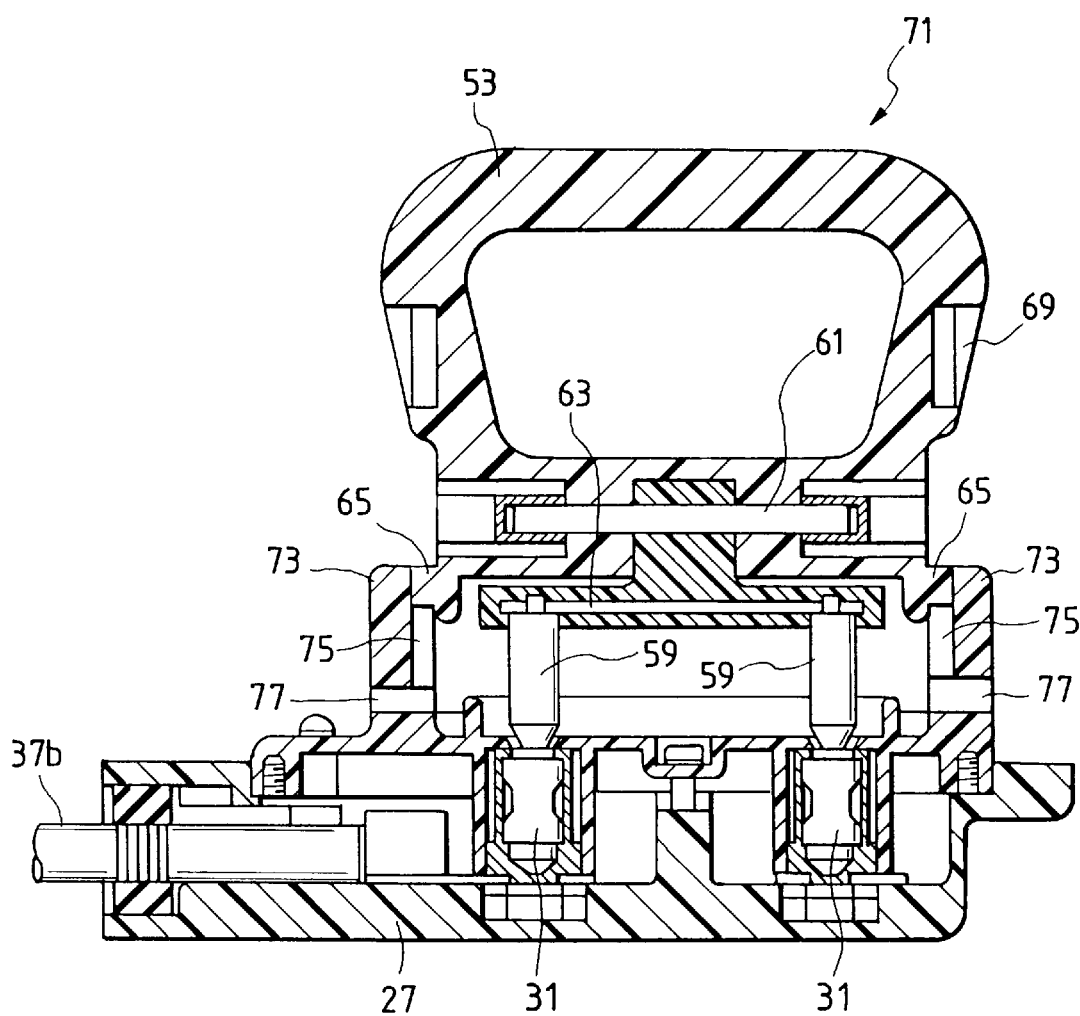
FIG. 8 is a sectional view showing the state at the time when the fitting of the detachable plug of the service plug shown in FIG. 7 is started.

Next, referring to FIGS. 7 to 9, another embodiment of the service plug according to the present invention will be described. FIG. 7 is a perspective view showing a second embodiment of the service plug according to the present invention, FIG. 8 is a sectional view showing the state at the time when the fitting of the detachable plug of the service plug shown in FIG. 7 is started, and FIG. 9 is an enlarged side view showing a guide wall shown in FIG. 7. The same reference numbers are allocated to the same members as those shown in FIGS. 1 to 6 and duplicate description is omitted. A service plug 71 in this embodiment is different from the above service plug 21 in guide walls 73 and guide grooves 75 respectively formed on the guide walls 73. The other part is constituted so that it is the same as that of the above service plug 21.

That is, the guide grooves 75, the upper ends of which are respectively open on the upper end faces of the guide walls 73 and which are long vertically, are formed on the respective opposite surfaces of the guide walls 73. For the length of each guide groove in the vertical direction, the lowest end is set to a position at which each boss 65 reaches when male terminals 59 are respectively completely fitted in female terminals 31. Arc-shaped refuge grooves 77 are respectively joined to the lower ends of the guide grooves 75 and are formed in the shape of a locus along which the bosses 65, which have respectively reached the lower ends of the grooves, are moved with a turning shaft 61 as the center.

Figure 9A:
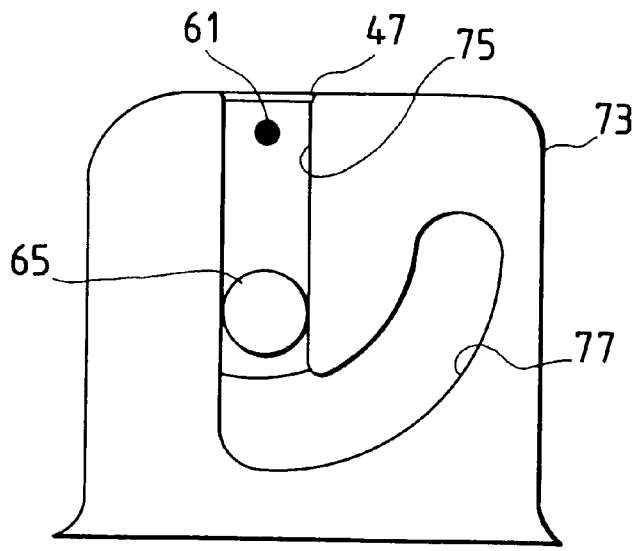
FIGS. 9(a) and 9(B) are enlarged side views showing a guide wall shown in FIG. 7.

In the service plug 71 constituted as described above, when the bosses 65 are respectively inserted into the guide grooves 75, the ends of the male terminals 59 enter the corresponding terminal insertion hole 41, and the lever 53 is pushed down in the direction of a circuit housing, the male terminals 59 are respectively fitted in the female terminals 31. At this time, as shown in FIG. 9(A), when the male terminals 59 are respectively fitted in the female terminals by a half, the bosses 65 do not respectively reach the lower ends of the guide grooves 75 and turning with the turning shaft 61 as the center is disabled by the regulation of the guide grooves 75. Therefore, hereby, the lever 53 cannot be folded and it is detected that the male terminals 59 and the female terminals 31 are fitted by a half.

Figure 9B:
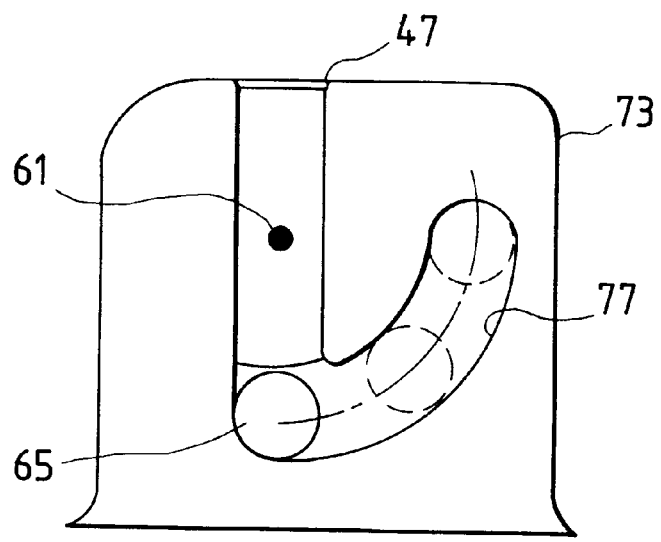
Figure 10:
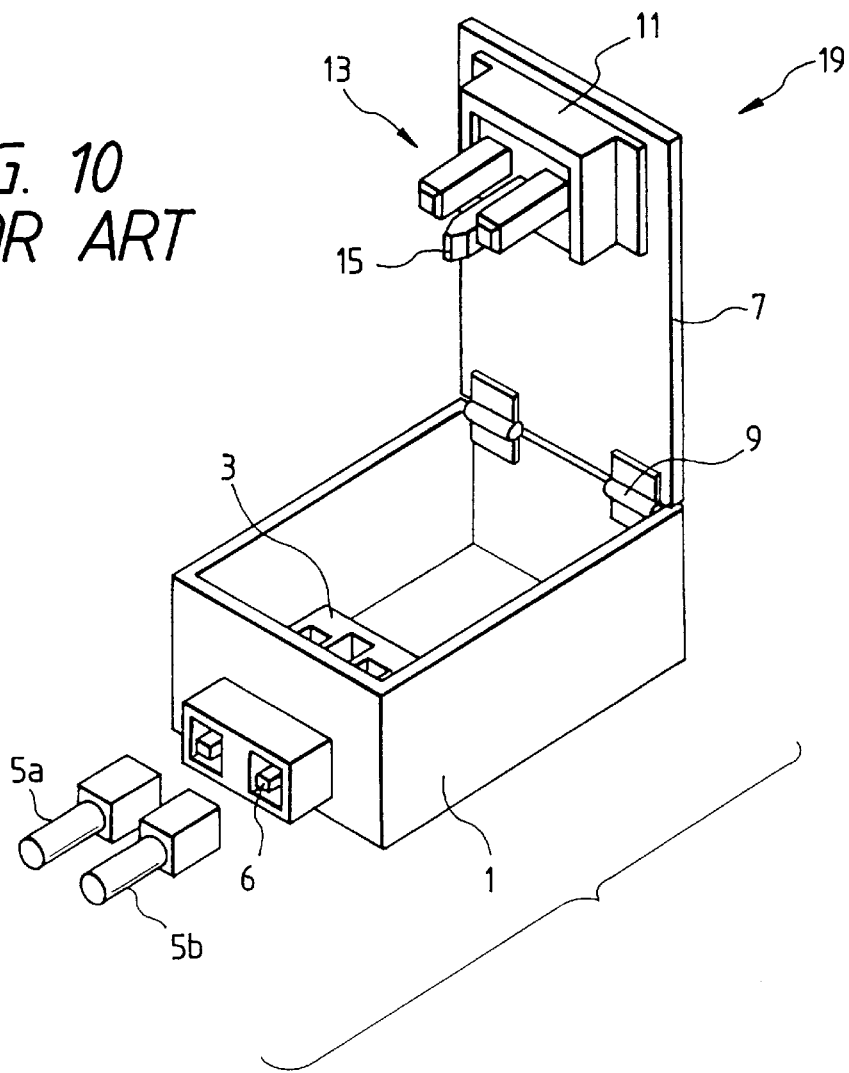
FIG. 10 is a perspective view showing a conventional connector device.
Figure 11:
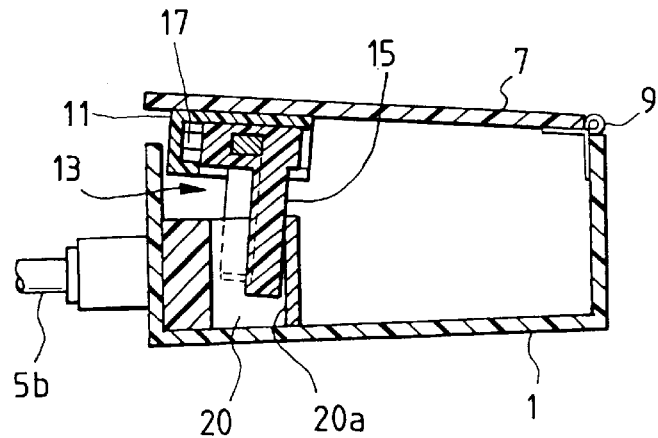
FIG. 11 is a sectional view showing a process in which a cover of the conventional connector device is shut.

In the meantime, as shown in FIG. 9(B), when the bosses 65 respectively reach the lower ends of the guide grooves 75, they can respectively enter the refuge grooves 77 through the guide grooves 75, so that the regulation of relative turning between the lever 53 and the plug body 57 is released and the lever 53 can be turned with the turning shaft 61 as the center. Hereby, it is verified that the male terminals 59 and the female terminals 31 are completely fitted.

As described above, according to the service plug 71 in the above second embodiment, in addition to the same effect as the above service plug 21, since the lower end of each guide groove 75 is set to a position at which the bosses 65 respectively reach when the male terminals 59 and the female terminals 31 are completely fitted, and the refuge grooves 77 are respectively joined to the lower ends of the guide grooves 75 and are formed in the shape of a locus along which the bosses 65 are moved with the turning shaft 61 as the center, the bosses 65 can be led to the refuge grooves 77 and the regulation of turning can be released only when the male terminals 59 are respectively completely fitted in the female terminals 31 and hereby, it can be detected that the male terminals 59 and the female terminals 31 are fitted by a half.

As described above in detail, according to the service plug according to the present invention, since the plug body can be attached to or detached from the circuit housing in the same direction as the terminals fitting direction, the terminals are not moved along an arc-shaped locus as in the conventional structure, and a mechanism for absorbing dislocation caused in a fitting process is not required to be provided. As a result, the structure can be simplified and the number of parts can be reduced. As the terminals are not moved along an arc-shaped locus, distortion can be eliminated and the terminals can be prevented from being deformed. Further, since the short-circuiting terminals can be- respectively led to the circuit terminals by respectively inserting the bosses into the guide grooves, the feeling of fit of the plug body can be enhanced. Further, when the lever is pushed down, since the short-circuiting terminals are inserted into the circuit terminals, the bosses respectively enter the guide grooves, and relative turning between the lever and the plug body can be regulated, the lever can be held stood and the feeling of fit of the plug body can be enhanced.

Also, according to the service plug in which the refuge grooves are respectively joined to the lower ends of the guide grooves, since the lower end of each guide groove is set to a position at which each boss reaches when the short-circuiting terminals and the circuit terminals are completely fitted, and each refuge groove is joined to the lower end of each guide groove, the regulation of the turning of the lever can be released only when the short-circuiting terminals and the circuit terminals are completely fitted and hereby, it can be detected that the short-circuiting terminals and the circuit terminals are fitted by a half.

What is claimed is:

1. A service plug, comprising:

at least a pair of circuit terminals respectively connected to an end of an open electric circuit;

a circuit housing provided with said pair of circuit terminals therein and terminal insertion holes corresponding to said pair of circuit terminals;

a pair of parallel guide walls extending perpendicularly from a surface of said circuit housing on which said insertion holes for said pair of circuit terminals are formed;

at least one guide groove formed on each of said parallel guide walls, being open on respective end faces of said guide walls, and formed along a fitting direction of said pair of circuit terminals;

a plug body provided with short-circuiting terminals for short-circuiting said pair of circuit terminals;

a lever rotatably coupled to said plug body via a turning shaft; and bosses protruding from said lever for respectively entering said guide grooves and positioning said pair of circuit terminals and said short-circuiting terminals so that said short-circuit terminals move in the fitting direction toward said pair of circuit terminals.

2. A service plug according to claim 1, further comprising refuge grooves having a shape of a locus along which said bosses are respectively moved with said turning shaft as the center, said refuge grooves being joined to respective lower ends of said guide grooves, and the respective lower ends of said guide grooves being set to a position at which said bosses respectively reach when said short-circuiting terminals and said circuit terminals are completely fitted.

3. A service plug according to claim 1, further comprising a magnet provided on said lever, a limit switch provided on said circuit housing, and a lever lock provided on said circuit housing for locking said lever in a folded position, wherein said limit switch cooperates with said magnet to determine when said lever is being locked by said lever lock.

* * * * *